United States Patent [19]

Kotcharian

[11] 4,105,819
[45] Aug. 8, 1978

[54] LAMINATED SHEETS PARTICULARLY FOR CRYOGENIC ENCLOSURES, PIPES, AND THE LIKE

[75] Inventor: Michel Kotcharian, Paris, France

[73] Assignee: Technigaz, Paris, France

[21] Appl. No.: 662,414

[22] Filed: Mar. 1, 1976

[30] Foreign Application Priority Data

Mar. 4, 1975 [FR] France .............................. 75 06732
Feb. 20, 1976 [FR] France .............................. 76 04810

[51] Int. Cl.² ..................... B32B 15/08; B32B 15/14; B32B 15/20; B65D 25/18
[52] U.S. Cl. .................................. 428/213; 220/901; 428/246; 428/251; 428/252; 428/285; 428/286; 428/433
[58] Field of Search .............. 428/213, 246, 251, 252, 428/285, 286, 263, 265, 268, 433; 220/9 LG; 114/74 A, 74 R

[56] References Cited

U.S. PATENT DOCUMENTS

| | | | |
|---|---|---|---|
| 1,801,666 | 4/1931 | Geer | 428/285 |
| 2,392,272 | 1/1946 | Snyder | 428/468 X |
| 3,009,601 | 11/1961 | Matsch | 220/9 LG |
| 3,138,517 | 6/1964 | Charbonneau | 428/251 X |
| 3,224,622 | 12/1965 | Kordyban et al. | 220/9 LG |
| 3,272,373 | 9/1966 | Alleaume et al. | 220/9 LG |
| 3,489,311 | 1/1970 | Folkerts et al. | 220/9 LG |
| 3,795,573 | 3/1974 | Smith et al. | 220/9 LG |
| 3,921,438 | 11/1975 | Katsuta | 220/9 LG X |
| 3,993,213 | 11/1976 | Burge et al. | 220/9 LG |

*Primary Examiner*—Harris A. Pitlick
*Attorney, Agent, or Firm*—Steinberg & Blake

[57] ABSTRACT

A relatively thin, flexible, impervious, sheet-like laminated building material comprising at least three continuous overlying layers of yielding material adapted to withstand very severe cold conditions, bonded together and consisting of at least one first mechanically strong supporting endmost layer; at least one impervious film-like layer and at least one second endmost lining layer providing at least a mechanical and at least temporary protection.

15 Claims, 8 Drawing Figures

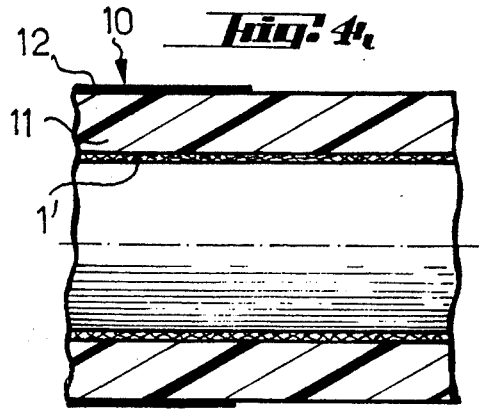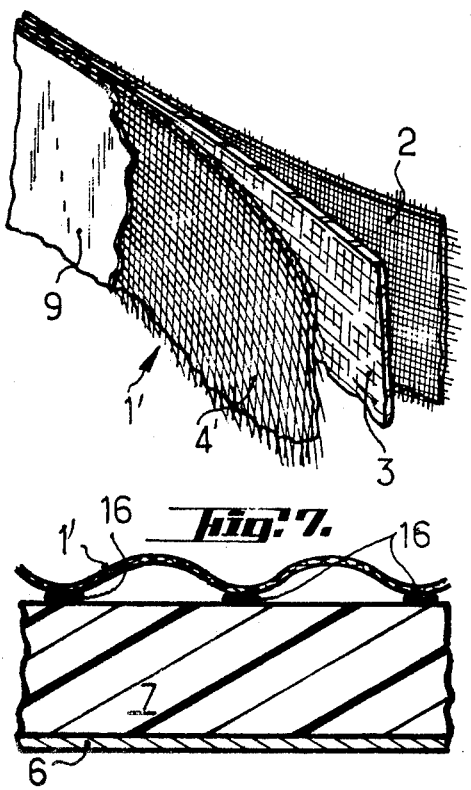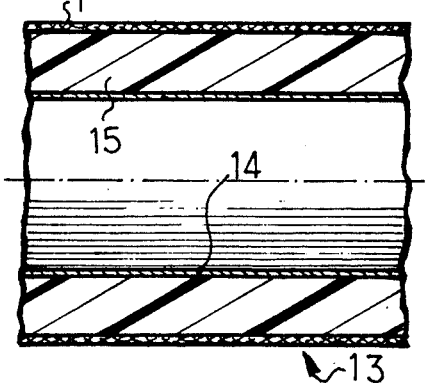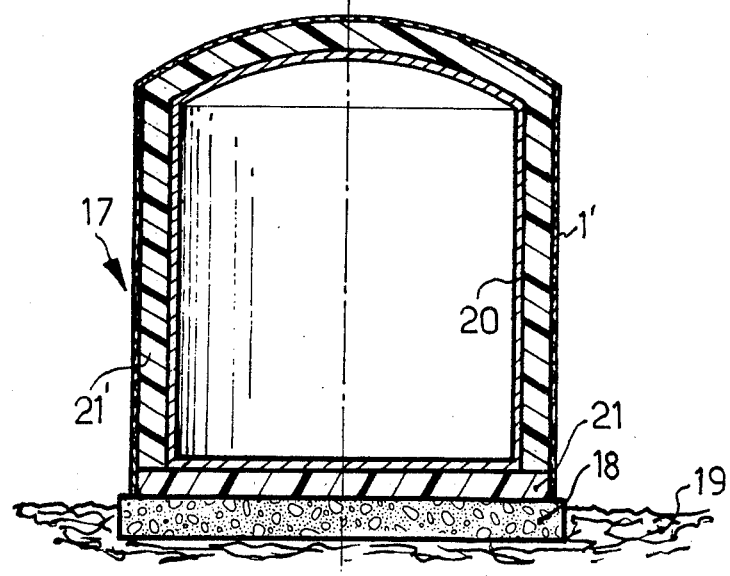

LAMINATED SHEETS PARTICULARLY FOR CRYOGENIC ENCLOSURES, PIPES, AND THE LIKE

The present invention relates generally to and has essentially for its subject matter, by way of a novel at least semi-finished industrial product, a composite relatively thin and flexible or yielding, sheet-like or strip-like or web-like, composite material for building or structural, lining, facing, covering, lagging or like fitting purposes, having a substantially impervious or fluid-tight or leak-proof laminated construction and the various applications and uses resulting from working same or putting same into practice as well as the various systems, assemblies or arrangements, buildings or constructions, equipments, plants and installations such as in particular improved cryogenic enclosures or like fluid-confining means provided with or incorporating such a material. The invention is also directed to the building elements and members or articles of manufacture or like goods forming in particular possibly modular composite panels or blocks or composite plates for lining, facing, lagging or wrapping, filling or like fitting purposes containing the aforesaid material.

In the prior state of the art there are presently known heat-insulated, sealed or fluid-tight, impervious or leak-proof tanks for storing, preserving, transporting or conveying in particular very cold fluids and more specifically liquids at very low temperatures such as for instance liquefied natural gases or methane which are in particular contained in multiple-wall tanks of for instance the so-called integrated kind with a substantially rigid outer structure forming a self-supporting envelope or casing, said tank comprising an innermost envelope for directly confining the fluid held therein, said envelope being located inside of and spaced from the outer envelope and forming a thin wall consisting of a substantially flexible impervious membrane made most often from a foil or thin sheet of metal such as aluminum, stainless steel, so-called Invar alloy or from any other suitable metal exhibiting equivalent properties or like qualities of resistance to very low temperature conditions. The intermediate space between the outermost and innermost envelopes is filled with an intermediate relatively thick layer of heat insulating material secured to the outer structure for being carried or supported by the latter and spacing said membrane from said outer structure, which membrane is applied against said intermediate layer which consists preferably from a substance or compound adapted to bear mechanical loads (such as weight, hydrostatic pressure, inertial forces, dynamic stresses or efforts, etc.) applied to the body of contained fluid and to convey them to said outer structure. Said metal membrane is either practically insensible to or unaffected by dimensional variations caused by deformations or strains such as contractions and expansions of thermal origin when it is made of so-called Invar alloy for instance or it is formed with excess material for instance in the shape of corrugations, pleats or similar folded formations for absorbing thermal deformations when it is made from another metal. Such tanks adapted in particular for the preservation or storage of liquefied natural gases (generally stored at a pressure close to ambient atmospheric pressure) may either form stationary storage enclosures or transportation tanks mounted on tanker-ships or conveying land-vehicles, in which case the inner tank-casing, shell or envelope is integrated into the ship's hull of which it then forms the hold for loading liquid cargo therein or into the land-vehicle body structure, the hull or body then forming the aforementioned outer self-supporting structure or rigid envelope.

The aforesaid metal membrane the exposed inner face or side of which is in direct contact with the fluid contained therein provides a so-called primary sealing barrier but the innermost envelope consisting of said membrane is often doubled by at least another intermediate envelope forming an impervious wall lying between said outer structure or envelope and said primary barrier to constitute a safety or so-called secondary sealing barrier which is often substantially of the same nature and configuration as the primary sealing barrier. Such metal membranes forming a normal (or main) sealing barrier and a safety (or auxiliary) sealing barrier, respectively, suffer from the inconvenience of being of a relatively complicated and therefore expensive preparation, manufacture, building or making as well as of a relatively difficult and costly positioning, mounting, assembly and fastening and they are generally made from noble and accordingly expensive metals while being relatively heavy in weight.

One main object of the invention is accordingly to remove or overcome the aforesaid drawbacks by providing a new material forming a relatively thin and flexible or yielding sheet-like, plate-like or strip-like substantially fluid-tight laminated semi-product which is characterized in that it comprises at least three overlying continuous layers or laminations made from flexible material adapted to withstand very severe cold conditions and assembled or connected together by bonding, sticking, gluing, welding or through a like or equivalent superficial adhesive connection and consisting of:

(a) at least one first outermost or end layer forming a tough or mechanically strong supporting means;

(b) at least one intermediate or central layer consisting of a film or skin impervious in particular to gaseous fluids; and (c) at least one second end or innermost or exposed layer forming an at least mechanically and at least temporarily protective lining or facing.

According to another characterizing feature of the invention said intermediate layer which is placed between both aforesaid opposite outer and inner layers in a sandwich-like manner is made from metal whereas said outer and inner layers or laminations are non-metallic and preferably made from suitable synthetic materials or artificial substances adapted to comply with technological conditions and operating requirements prescribed by their final use, service destination or working conditions.

The novel and improved material according to the invention offers the advantage of a very simple and easy manufacture, working and use as well as of a ready laying or mounting in particular through simple bonding by means for instance of a suitable synthetic resin so that it is of a very economical use and production while exhibiting outstanding qualities, capabilities or abilities of behavior under cold conditions, mechanical endurance and physical durability and preservation.

According as said second inner layer is adapted to remain exposed, bare or uncovered (in particular when the material is intended to form a primary sealing barrier) or to be covered, i.e., concealed or hidden (for instance when this material is used as such as an intermediate layer incorporated into the inside of a multiple-wall structure while being in particular integrated into the thickness of a layer of heat insulating material forming one of the component elements of such a wall construction, said intermediate layer then constituting a secondary sealing barrier), the nature or constitution of this layer is different and adapted to the use which meets the purpose set for said building material.

The invention is of use in particular in some specific applications such as in a fluid-tight heat-insulated tank for very cold fluids, of the type previously defined and which is characterized in that its primary sealing barrier is made from the aforesaid material the second or inner layer of which would then suit such a function.

According to a further characterizing feature of the invention when said tank comprises at least one secondary sealing barrier the latter is made from said building material the second or inner layer of which is adapted to suit such a function.

The invention will be better understood and other objects, characterizing features, details and advantages thereof will appear more clearly as the following explanatory description proceeds with reference to the accompanying diagrammatic drawings given by way of non limiting examples only illustrating various presently preferred specific forms of embodiment of the invention and wherein:

FIG. 3 is a view similar to FIG. 2 but showing an alternative embodiment or modification adapted to form a vapour leak-proof or secondary sealing barrier;

FIG. 4 is a fragmentary view in longitudinal section of a tubular pipe made from heat insulating material and internally lined with the material illustrated in FIG. 3;

FIG. 5 is a fragmentary view in longitudinal section of a tubular for instance metallic pipe heat-insulated on the outside and the heat-insulating material of which is externally surrounded or enclosed by a lining envelope forming a vapor leak-proof barrier consisting of the material shown in FIG. 3;

FIG. 7 is a fragmentary cross-sectional view showing a configuration for applying and fastening the material illustrated in FIG. 3 and forming a primary sealing barrier to the innermost face of the layer of heat insulating material of the wall structure of a heat-insulated fluid-tight tank the primary barrier of which forms an integrated container; and FIG. 8 is a view drawn in vertical section on a smaller scale of a closed heat insulating fluid-tight tank with an externally heat-insulated self-supporting rigid container and the outer layer of heat insulating material of which is surrounded or encompassed at least for its major part by a vapor leak-proof impervious envelope consisting of the material illustrated in FIG. 3.

Figure 1:
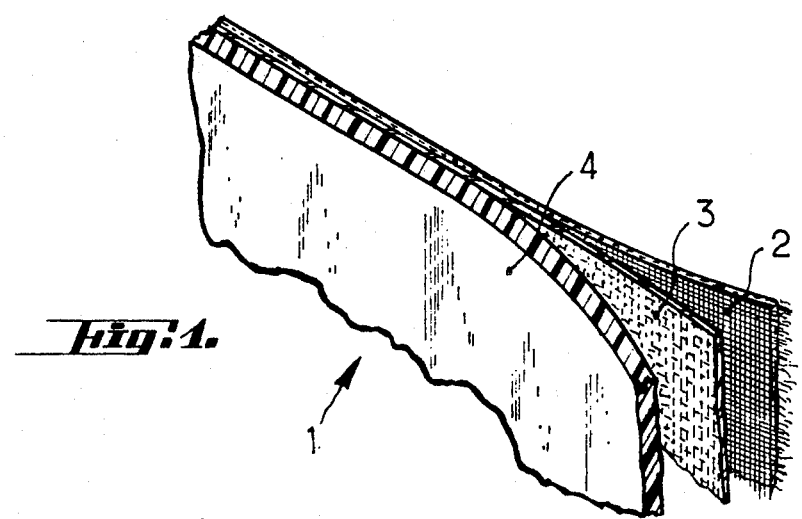
FIG. 1 is a fragmentary perspective view partially in section, with parts broken away, showing the new material for a primary sealing barrier the various component layers of which have been partially separated from each other at their interfaces to better disclose the composition of the material.

According to the embodiment shown in FIG. 1 of the drawings the new material for a primary sealing barrier generally denoted by the reference numeral 1 comprises an outermost or possibly hidden layer 2 consisting preferably of a fabric made from mineral fibres such as glass fibres for instance or of an equivalent (artificial or synthetic) chemical textile material. The intermediate layer 3 is made from a film, skin, foil or thin sheet of a metal such as aluminum, stainless steel, so-called Invar alloy or from any other equivalent noble metal. The innermost layer 4 the inner face or side of which is adapted to remain exposed, i.e., bare and in direct contact with the cryogenic fluid contained therein forms a fluid-tight preferably resilient safety lining consisting in particular either of a polyurethane elastomer such as the substance known under the name of "Adiprene" or of a silicon elastomer such as the substance known under the name of "Frigetan" or from any other equivalent artificial or synthetic plastics material preferably exhibiting elastomeric properties or of a synthetic rubber.

By way of merely ilustrative statement the outermost layer 2 has a thickness of about 0.3 mm and the thickness of the innermost layer 4 is of about 1 mm whereas the thickness of the intermediate layer 3 may be of a few hundredths of a millimeter.

Figure 2:
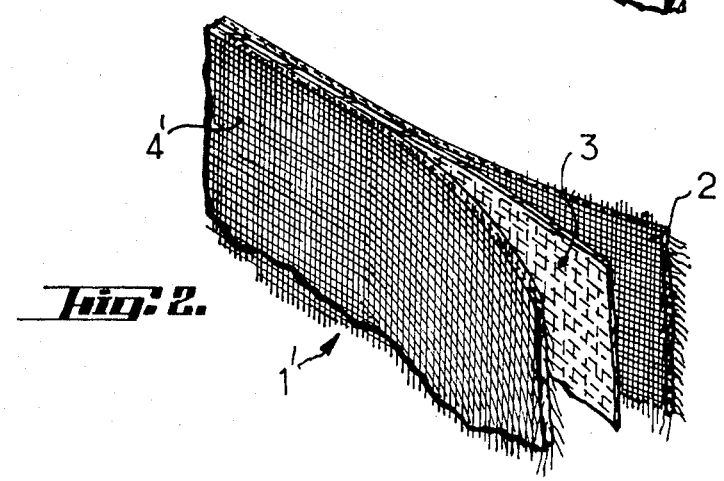
FIG. 2 is a view similar to the foregoing one but showing the material adapted to form a secondary sealing barrier.

FIG. 2 shows the composition of the new material 1' adapted to form a secondary sealing barrier. The outer layer 2 and intermediate layer 3, respectively, have the same constitutions as in the case of the primary sealing barrier whereas the innermost layer 4' is here made from a substance adapted to enable an easy bonding and which is for instance substantially identical with or similar to the outer layer 2 as far as the nature and thickness of the material are concerned. Therefore the layer 4' may consist of a fabric or web of mineral fibres such as glass fibres or of an equivalent (artificial or synthetic) chemical textile material and exhibit a thickness of about 0.3 mm (hence the same thickness as the layer 2) so that the assembly 1' forms a kind of sandwich construction.

The structure shown in FIG. 2 may set a limit upon the utilization capabilities of the material 1' having a construction as defined hereinabove to a relatively physical position or location incorporated into or inside of a body of surrounding coherent or solid material in which said first-named material is thus embedded or entrapped.

Moreover it may happen that when using the material 1 according to FIG. 1 and connecting to sheets of such a material juxtaposed side by side through the innermost elastomeric layer either by means of a bonded lap-joint or by means of a bonded butt strip or like welt, the shearing forces or stresses generated within the connecting joint through thermal contraction are likely to cause a failure or breakage in the bonded joint because the bonded connection only affects said elastomeric layer which poorly withstands in particular shearing forces.

The construction shown in FIG. 3 enables to avoid such a difficulty and to extend the possibility of using such a material to a wide variety of utilizations and services thereby substantially broadening the scope of its applications by providing a multiple-purpose or versatile, stuff of substantially universal use. For this purpose and in order to solve the above technical problem said material according to the invention is characterized in that at least in the finished lining or facing condition finally mounted or laid at its location of application or use for instance onto an end face of a wall structure at least the exposed end face of visible layer of glass fibres of said material is covered or coated preferably evenly or substantially uniformly with a substantially continuous mechanically protective layer made possibly from a synthetic plastics material selected for instance from the group of substances known under the names of Adiprene, Hypalon, Neoprene or the like supplied as a film or skin applied after said material has been laid, said film or skin being applied possibly by spraying in a powdery or finely divided state or through a coating step. It has been stated that Adiprene is a synthetic polyurethane elastomer or rubber whereas Hypalon (created by the U.S. Firm Du Pont de Nemours) is a synthetic rubber or elastomer described as a chlorosulfonated polyethylene and Neoprene is a synthetic rubber or elastomer made by polymerization of chloroprene (chlorobutadiene) also known as Government rubber monovinylacetylene.

This arrangement offers the advantage of enabling the use of the aforesaid material as an exposed or visible superficial lining end layer onto any wall structure thereby being very interesting from an economical standpoint since the material is relatively inexpensive and of an easy workability as well as of a simple application while exhibiting a satisfactory mechanical strength or toughness as well as a good thermal behaviour.

According to the embodiment shown in FIG. 3 the new composite laminated material generally designated by the reference numeral 1' comprises an intermediate metal layer 3 having the nature previously defined and a thickness of for instance a few hundredths of a millimeter, which is positioned between two opposite end or bounding layers 2 and 4', respectively, consisting each one of a fabric or web of glass fibres having a thickness of for instance about 0.3 mm, these three layers being bonded or laminated together. One of the end layers which is adapted to remain exposed, i.e., layer 4', to form a visible uncovered face after the material 1' has been applied against an end or boundary face of a wall structure will receive after the material 1' has been laid a protective film of plastics material 9 having the nature stated hereinabove and applied as by being spread in a powdery condition onto the wall surface thus consisting of the material 1' after the latter has been laid onto the supporting structure. The film 9 thus constituting the exposed end or boundary face of the material 1' will protect the layer 4' against mechanical effects, actions or attacks of any kind.

FIGS. 4 and 5 show two examplary applications, respectively, of the material 1' according to FIG. 3 to a heat-insulated fluid-tight building element forming a forced guiding passage-way means for the flow of in particular very cold fluids, such as a pipe, a duct or like tubular bulk conveying means (fluid carrying pipe-lines) of the type provided with a side wall made of overlying multiple or composite layers comprising at least one layer of heat-insulating material lined with an impervious layer forming a vapour leak-proof barrier with a visible or exposed wall surface. According to the invention this vapour leak-proof barrier consists of the material 1' shown in FIG. 3 the exposed side of which is preferably covered or coated with the aforesaid protective plastics film applied after said material has been laid. According to the examplary form of embodiment shown in FIG. 4 the building element or pipe 10 is wholly constituted throughout by the aforesaid tubular layer of coherent heat-insulating material 11 which is stiff or rigid enough to withstand the inner pressure exerted by the conveyed fluid and possibly surrounded by an outer for instance protective sheath, jacket, quill, cover or like wrapping 12. According to the invention this layer of heat insulating material 11 is internally faced, i.e., lined on its radially inner side with the vapor leak-proof barrier consisting of the material 1' illustrated in FIG. 3 and bounding or defining the exposed inner wall surface of the pipe.

According to the alternative embodiment or modification shown in FIG. 5 the building element 13 consists of an inner preferably metallic tube 14 surrounded by said layer or lagging of heat insulating material 15 and according to the invention this layer or lagging of heat insulating material is externally lined with a vapour leak-proof barrier consisting of the material 1' defining or bounding the exposed outer wall surface of the pipe 13.

Figure 6:
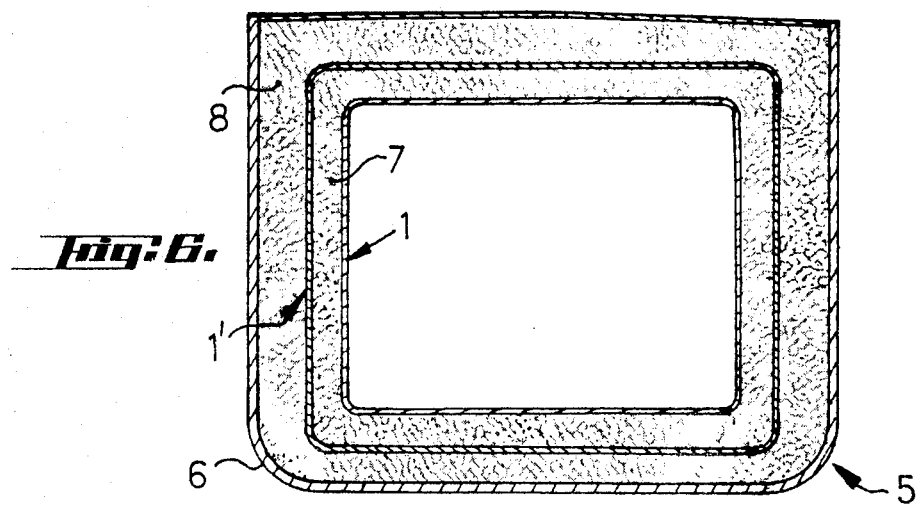
FIG. 6 is a cross-sectional view on a smaller scale of a cryogenic tank into which are incorporated the materials illustrated in FIGS. 1 and 2.

FIG. 6 illustrates a form of embodiment of a cryogenic tank 5 to which the aforesaid materials are applied. This tank comprises an outer rigid envelope or casing 6 made for instance from metal or from reinforced or prestressed concrete in the case of a stationary storage tank provided on land or it is constituted by the double hull of a tanker-ship or like conveyance or by the structural body of a land vehicle in the case of movable or travelling plants. The inner impervious envelope 1 forming a primary sealing barrier has its wall consisting of a membrane made from the material shown in FIG. 1 and the tank may comprise at least one intermediate fluid-tight safety layer 1' forming a secondary sealing barrier the wall of which consists of the material shown in FIG. 2. The primary sealing barrier 1 and the secondary sealing barrier 1', respectively, are spaced from each other as well as from the wall of the outer envelope 6 and the intermediate spaces thus left or defined between both barriers 1, 1' on the one hand and between the secondary barrier 1' and the outer envelope 6 on the other hand are filled with layers of heat-insulating material 7 and 8, respectively, made for instance from cellular foam or expanded plastics material, from Balsa wood or from any other equivalent solid or coherent substance against the corresponding adjacent surfaces of which the primary barrier 1 and the secondary barrier 1', respectively, are secured or fastened as by bonding.

As already stated previously the component layers of the material according to FIG. 1 as well as to FIGS. 2 and 3 are mutually assembled to each other as by bonding, gluing, sticking, welding or any other suitable equivalent means.

FIG. 7 illustrates one portion of a closed heat-insulated fluid-tight tank in particular for holding very cold fluids, of the type shown in FIG. 6, forming a multiple-wall tank integrated into an outer rigid self-supporting enclosing structure or envelope 6 and comprising an innermost thin wall 1' for confinment of the contained fluid, consisting of a flexible impervious membrane forming a primary sealing barrier and at least one relatively thick intermediate layer of heat-insulating material 7 internally secured to said outer structure 6 and spacing the latter from said membrane applied against said intermediate layer, said heat-insulating layer 7 being adapted to bear the loads applied by a cryogenic fluid and to convey them to said outer structure 6. According to the invention said primary barrier consists of the material 1' shown in FIG. 3 the inner or exposed face of which is covered or coated with said protective plastics film 9 applied after said material has been laid. It should be understood that as in the case of the embodiment illustrated in FIG. 6 the layer of heat-insulating material 7 may itself incorporate in its thickness a secondary or intermediate sealing barrier (not shown in FIG. 7) such as denoted at 1' in FIG. 6 and spaced outwards from the primary barrier thereby dividing the layer of heat-insulating material into two inner and outer layers 7 and 8, respectively, (see FIG. 6), this secondary barrier completely surrounding the primary barrier and being constituted by the material 1' shown in FIG. 2, i.e., devoid of the protective plastics film 9.

In the embodiment illustrated in FIG. 7 this primary sealing barrier 1' is advantageously secured locally as by bonding at discrete mutually spaced points 16 to said layer of heat-insulating material 7 while leaving an excess of material for instance as pleats, folds or corrugations between the successive connecting points 16 so that the geodesic distance between any two such neighbouring points on the surface of said layer of heat-insulating material 7 is smaller than their curvilinear distance on the surface of said primary barrier 1'. This arrangement offers the advantage of a flexible mounting of the material 1' in its wavy configuration enabling to the corrugations thereof to readily contract at least partially under the action of the pressure applied as well as contractions of thermal origin.

FIG. 8 illustrates a closed heat-insulated fluid-tight tank 17 adapted in particular for the storage of very cold fluids and in particular of cryogenic liquids and resting or built for instance on a foundation slab or base 18 made from concrete and at least partially embedded into the ground 19. This tank for instance of a substantially vertical cylindrical shape is of the type consisting of an in particular metallic impervious substantially rigid and self-supporting container or shell 20 externally surrounded by at least one layer of heat-insulating material secured to the outer wall surface of said container or shell. This heat-insulating layer may for instance comprise a horizontal lower or bottom base layer 21 consisting for instance of a substance known under the name of foam-glass as well as side and upper or top layers 21' made for instance from polyurethane foam or from a like expanded substance. This heat-insulating layer is itself surrounded by an envelope at least over all its exposed outer (in particular side and top) surface and according to the invention this external envelope forms a fluid-tight vapour leak-proof barrier consisting of the material 1' shown in FIG. 3.

It should be understood that the invention is not at all limited to the forms of embodiment disclosed and shown which have been given by way of examples only. In particular it comprises all the means constituting technical equivalents of the means described as well as their combinations if same are carried out according to its gist and used within the scope of the appended claims.

What is claimed is:

1. A laminated sheet material particularly adapted for use in conjunction with a heat-insulating material of a cryogenic enclosure or pipe for receiving a cold fluid such as liquified natural gas, methane, or the like, said laminated sheet material comprising at least three but not more than four layers secured to each other for defining between themselves a pair of interfaces situated respectively between two of said layers and a third, intermediate layer, the latter intermediate layer being in the form of a thin, flexible metal sheet forming a fluid-impervious film, skin, or foil the material of which is selected from the group consisting of aluminum, stainless steel, and Invar, while one of said two layers at one of said interfaces is a flexible glass-fiber fabric while being only thick enough to protect and support said metallic layer and provide a secure connection to a heat-insulating material, the other of said two layers at the other interface being selected from the group consisting of said glass-fiber fabric and a fluid-tight elastomeric material only thick enough to directly contact a cold fluid while protecting said metallic layer, said elastomeric material being selected from the group consisting of a polyurethane elastomer and a silicon elastomer, said intermediate metallic layer being thinner than the other two layers and all three layers together having a total thickness small enough to achieve sufficient flexibility to serve as a primary or secondary sealing barrier in a cryogenic enclosure or as an inner lining or outer wrapping in a cryogenic pipe when used in connection with a heat-insulating material of such an enclosure or pipe, while the other of said two layers also cooperates with said metallic layer and said one glass-fiber fabric layer to afford sufficient resilience and yieldability to transmit forces through said three laminated layers to the heat-insulating material without minimizing the fluid-imperviousness of said metallic layer.

2. The combination of claim 1 and wherein said intermediate metallic layer is Invar.

3. The combination of claim 1 and wherein said intermediate metallic layer has a thickness on the order of a few hundredths of a millimeter.

4. The combination of claim 1 and wherein said glass-fiber fabric has a thickness on the order of 0.3 mm.

5. The combination of claim 1 and wherein the other of said two layers is a polyurethane elastomer.

6. The combination of claim 5 and wherein said polyurethane elastomer is Adiprene.

7. The combination of claim 5 and wherein said polyurethane elastomer layer has a thickness on the order of 1 mm.

8. The combination of claim 1 and wherein the other of said two layers is a silicon elastomer.

9. The combination of claim 8 and wherein said silicon elastomer layer has a thickness on the order of 1 mm.

10. The combination of claim 1 and wherein the laminated sheet material consists only of three layers and is particularly adapted to serve as a primary sealing barrier, said three layers including only said intermediate metallic layer, said glass-fiber fabric at one interface, and said fluid-tight elastomeric layer at the other interface.

11. The combination of claim 10 and wherein said glass-fiber fabric, metallic, and elastomeric layers respectively have thicknesses on the order of 0.3 mm, a few hundredths of a millimeter, and 1 mm.

12. The combination of claim 1 and wherein the laminated sheet material consists only of three layers and is particularly suited to form a secondary sealing barrier, said three layers including said metallic layer and identical glass-fiber fabric layers at said interfaces.

13. The combination of claim 12 and wherein said metallic layer has a thickness on the order of a few hundredths of a millimeter while said glass-fiber fabric layers each have a thickness on the order of 0.3 mm.

14. The combination of claim 1 and wherein the laminated sheet material is adapted to be situated at an exposed wall face and includes said intermediate metallic layer and inner and outer layers formed respectively by said glass-fiber fabric layers at said interfaces, and only a fourth synthetic plastic layer secured to said outer layer and having the construction of a coating applied originally in a finely divided state and forming a continuous covering of the laminated sheet material, said coating being selected from the group comprising Adiprene, Hypalon, and Neoprene.

15. The combination of claim 14 and wherein said metallic layer and glass-fiber fabric layers secured thereto are in the form of portions having edges bonded to each other and said coating extending continuously across said connected portions for protecting the latter.

* * * * *